(12) United States Patent
Roskwitalski

(10) Patent No.: US 10,605,290 B1
(45) Date of Patent: Mar. 31, 2020

(54) CONNECTOR ASSEMBLY

(71) Applicant: Robert M. Roskwitalski, Hamburg, NY (US)

(72) Inventor: Robert M. Roskwitalski, Hamburg, NY (US)

(*) Notice: Subject to any disclaimer, the term of this patent is extended or adjusted under 35 U.S.C. 154(b) by 771 days.

(21) Appl. No.: 15/217,761

(22) Filed: Jul. 22, 2016

Related U.S. Application Data

(60) Provisional application No. 62/195,491, filed on Jul. 22, 2015.

(51) Int. Cl.
*F16B 31/02* (2006.01)
*A47G 29/12* (2006.01)

(52) U.S. Cl.
CPC ........ *F16B 31/021* (2013.01); *A47G 29/1216* (2013.01); *Y10T 403/11* (2015.01)

(58) Field of Classification Search
CPC .. F16B 31/021; F16B 35/041; A47G 29/1216; F16F 1/12; F16F 1/121; F16F 1/125; Y10T 403/11
USPC ..... 403/2; 411/383, 384, 390, 392; 267/170, 267/174, 175, 179; 232/39
See application file for complete search history.

(56) References Cited

U.S. PATENT DOCUMENTS

| 768,283 | A | * | 8/1904 | Jenkins | F16B 13/066 |
| | | | | | 411/18 |
| 954,588 | A | * | 4/1910 | Randall | A47G 29/1216 |
| | | | | | 248/145 |
| 1,220,908 | A | | 3/1917 | Thomas | |
| 1,434,737 | A | | 11/1922 | Enzenauer | |
| 1,462,925 | A | | 7/1923 | Wilburger | |
| 1,561,119 | A | | 11/1925 | Smith | |
| 2,117,701 | A | | 5/1938 | Burnett | |
| 2,138,919 | A | | 12/1938 | Herman | |
| 2,514,394 | A | | 7/1950 | Irving | |
| 2,586,556 | A | * | 2/1952 | Mullikin | B42F 13/02 |
| | | | | | 402/57 |
| 2,995,330 | A | * | 8/1961 | Alms | A47G 29/1216 |
| | | | | | 248/145 |
| 3,018,127 | A | * | 1/1962 | Dobrosielski | F16J 13/18 |
| | | | | | 292/251 |
| 3,065,660 | A | | 11/1962 | Puterbaugh | |

(Continued)

FOREIGN PATENT DOCUMENTS

JP  H0495605  3/1992
JP  2005325999  11/2005

*Primary Examiner* — Josh Skroupa
(74) *Attorney, Agent, or Firm* — Hodgson Russ LLP

(57) ABSTRACT

A fastener assembly may have a spring, a bolt, a stud, an end-piece, and a shear pin. In one embodiment of the invention, the bolt has (a) a shaft engaged with a first end of the spring, (b) a head, and (c) an internally-facing surface defining a passageway that extends through the bolt head and the bolt shaft. The stud has (a) a first end and (b) a second end, and the first end of the stud is engaged with a second end of the spring. The stud may include an internally-facing surface defining a hole that extends from the first end toward the second end of the stud. The end-piece, which may be a nut or an anchor, is engaged with the second end of the stud. Part of the shear pin resides in the passageway of the bolt, and a different part of the shear pin engages the stud. Also, the shear pin may include a slot on an end of the shear pin that may be used to remove a portion of the shear pin from the stud after the shear pin breaks.

22 Claims, 6 Drawing Sheets

(56) References Cited

U.S. PATENT DOCUMENTS

| | | | | |
|---|---|---|---|---|
| 3,390,906 A * | 7/1968 | Wing | ............... | F16B 31/021 |
| | | | | 403/11 |
| 3,419,298 A * | 12/1968 | Worley | ............... | E03D 11/16 |
| | | | | 403/24 |
| 3,658,284 A * | 4/1972 | Haasl | ............... | A47G 29/1216 |
| | | | | 248/145 |
| 3,763,402 A | 10/1973 | Shore et al. | | |
| 3,905,141 A | 9/1975 | Chichester, Jr. | | |
| 3,943,882 A | 3/1976 | Sollak et al. | | |
| 4,004,486 A * | 1/1977 | Schenk | ............... | F16B 5/0266 |
| | | | | 411/16 |
| 4,437,286 A | 3/1984 | Maguire | | |
| 4,686,926 A | 8/1987 | Vance | | |
| 4,704,748 A | 11/1987 | Takeda et al. | | |
| 4,762,453 A | 8/1988 | DeCaro | | |
| 4,779,850 A | 10/1988 | Paton et al. | | |
| 4,995,576 A * | 2/1991 | Kieswetter | ............... | A47G 29/1216 |
| | | | | 248/145 |
| 5,102,276 A | 4/1992 | Gourd | | |
| 5,129,232 A | 7/1992 | Minas et al. | | |
| 5,248,159 A | 9/1993 | Moore | | |
| 5,961,266 A * | 10/1999 | Tseng | ............... | F16B 37/12 |
| | | | | 411/289 |
| 6,554,526 B1 | 4/2003 | Egelandsdal | | |
| 6,637,531 B2 * | 10/2003 | Palenchar | ............... | B62D 25/10 |
| | | | | 180/69.21 |
| 7,121,780 B2 * | 10/2006 | Matich | ............... | F16B 5/02 |
| | | | | 411/367 |
| 7,249,923 B2 | 7/2007 | Niku | | |
| 7,601,167 B2 | 10/2009 | Lieberman | | |
| 7,789,607 B2 * | 9/2010 | Fuest | ............... | F16B 35/06 |
| | | | | 411/383 |
| 7,871,251 B2 | 1/2011 | Marino et al. | | |
| 8,355,243 B2 * | 1/2013 | Niedzwiecki | ............... | H02B 11/133 |
| | | | | 200/50.24 |
| 8,434,983 B2 * | 5/2013 | Chen | ............... | F16B 5/0208 |
| | | | | 411/347 |
| 8,517,649 B2 * | 8/2013 | Pratt | ............... | F16B 13/066 |
| | | | | 411/34 |
| 8,623,049 B2 | 1/2014 | Ward | | |
| 9,808,106 B1 * | 11/2017 | Bihn | ............... | A47G 29/1216 |
| 10,017,905 B2 * | 7/2018 | Young, Jr. | ............... | E01C 19/42 |
| 2008/0080952 A1 * | 4/2008 | Cook | ............... | F16B 35/005 |
| | | | | 411/398 |
| 2010/0143069 A1 | 6/2010 | Moore | | |
| 2010/0237143 A1 * | 9/2010 | LaBrecque, Jr. | .. | A47G 29/1216 |
| | | | | 232/39 |
| 2010/0282832 A1 * | 11/2010 | Do | ............... | A47G 29/1216 |
| | | | | 232/39 |
| 2014/0086703 A1 | 3/2014 | Thommes | | |
| 2014/0263881 A1 * | 9/2014 | Bryan | ............... | A47G 29/1216 |
| | | | | 248/125.2 |
| 2015/0374158 A1 * | 12/2015 | Schroeder | ............... | F16M 11/08 |
| | | | | 248/131 |
| 2017/0043209 A1 * | 2/2017 | Walstead, Jr. | ...... | A63B 22/0285 |
| 2017/0295978 A1 * | 10/2017 | Bihn | ............... | A47G 29/1216 |

\* cited by examiner

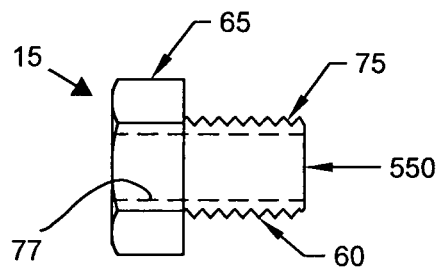
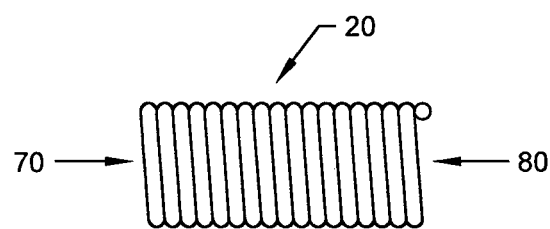
FIG. 5    FIG. 6
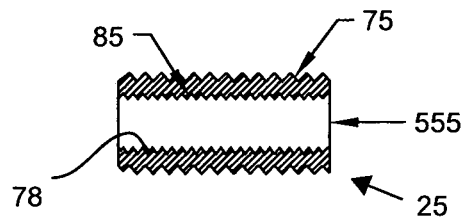
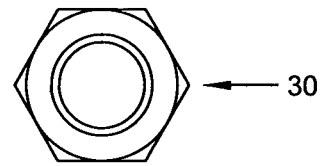
FIG. 7    FIG. 8
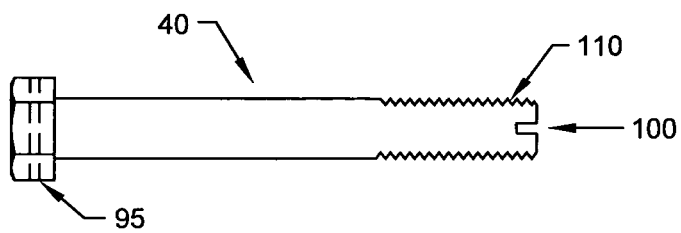
FIG. 9
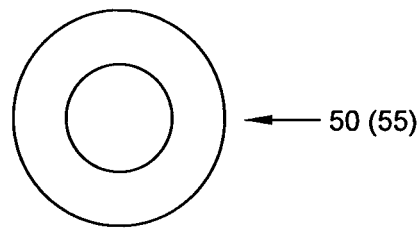
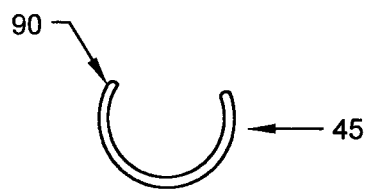
FIG. 10    FIG. 11

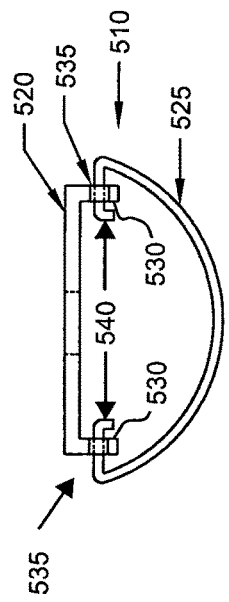
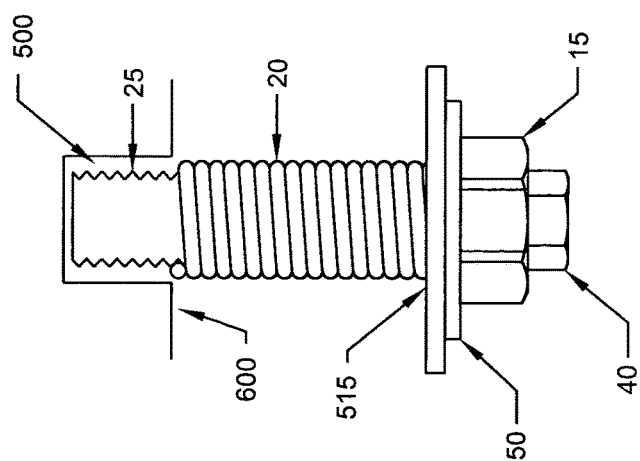
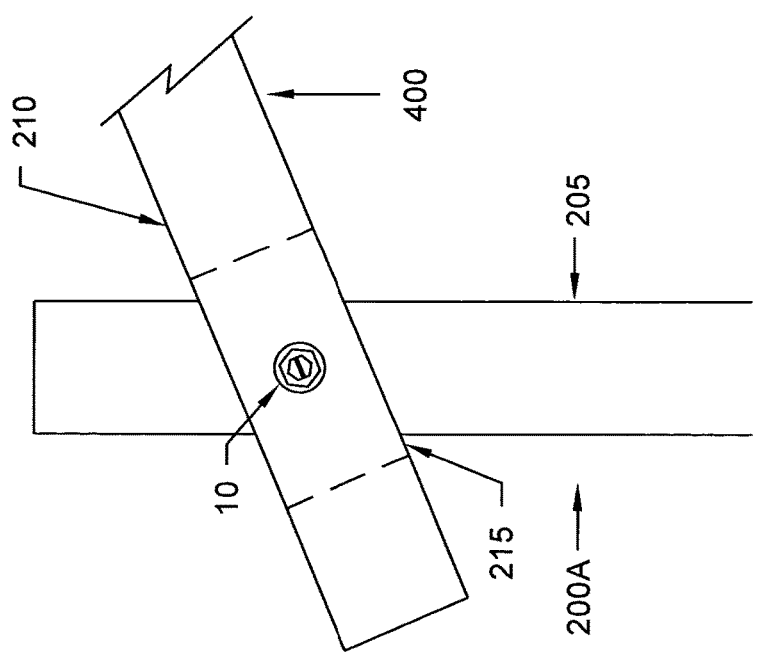
FIG. 16
FIG. 17
FIG. 15

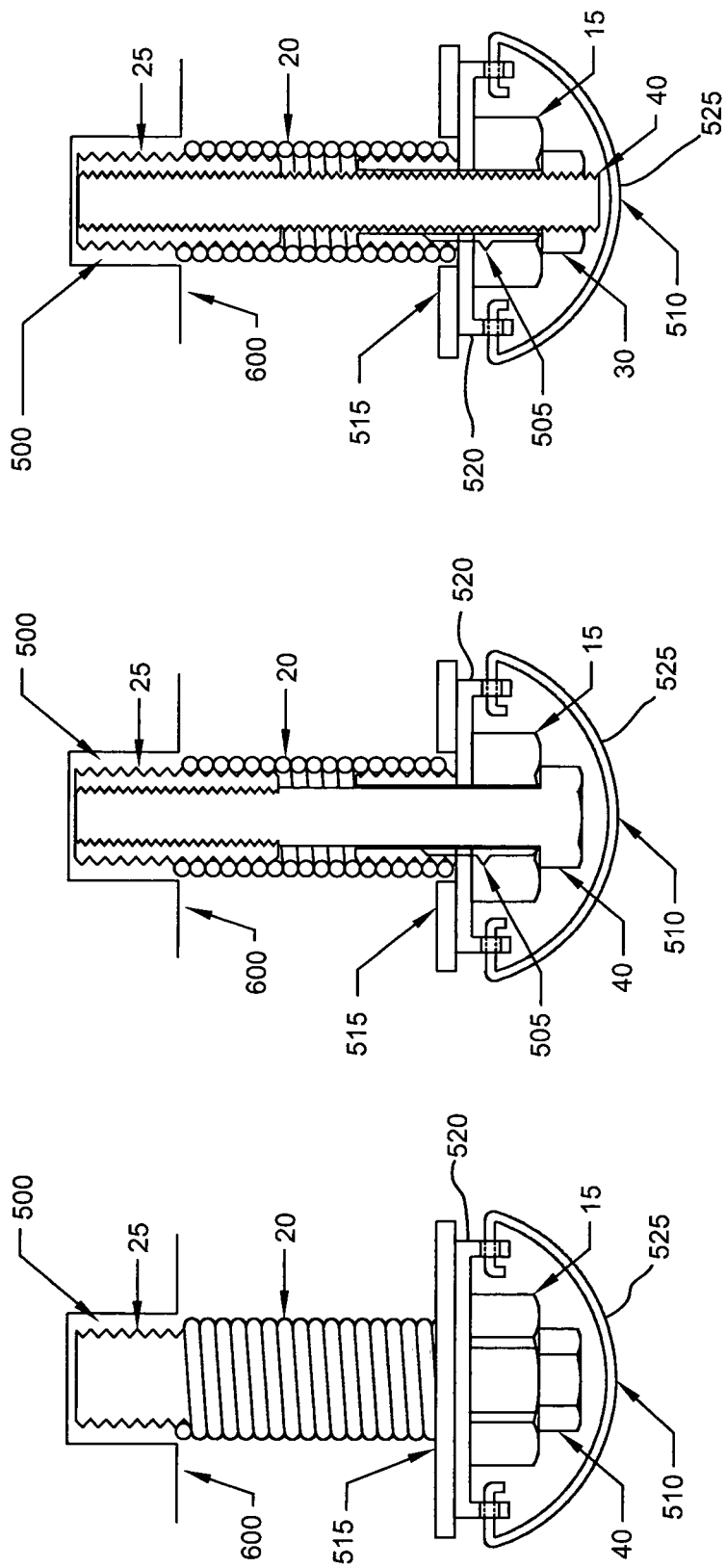

CONNECTOR ASSEMBLY

CROSS-REFERENCE TO RELATED APPLICATION

This application claims the benefit of priority to U.S. provisional patent application Ser. No. 62/195,491, filed on Jul. 22, 2015.

FIELD OF THE INVENTION

The present invention relates to devices/systems/methods of establishing a physical connection between two objects.

BACKGROUND OF THE INVENTION

In the prior art, two objects are commonly connected to one another and fixed relative to each other by using nails, bolts and nuts, screws and/or adhesives. For example, in a mailbox post, a substantially vertical wooden beam is commonly attached to a substantially horizontal wooden beam by nails. These prior art connecting systems can be damaged or the objects themselves can be damaged if a sufficient force is applied to one or both objects. For example, if a snow plow strikes the horizontal beam of the mailbox post, the horizontal wooden beam may transmit the force from the snow plow to the nails, the nails may be bent or broken, and the wooden beams (both vertical and horizontal) are often damaged. It would be useful to have a system that will serve to connect two objects (such as the wooden beams of a mailbox post) to each other, and fix those objects relative to each other until a force of sufficient magnitude is applied, and upon the application of such a force, the system would allow the objects to move relative to each other so as to avoid damage to the objects until the force is withdrawn, and then hold the objects again following removal of the force in a manner that facilitates continued use.

SUMMARY OF THE INVENTION

The invention may be embodied as a fastener assembly having a spring, a first threaded stud device (the "first stud device"), a second threaded stud device (the "second stud device"), and a rigid shear pin. The first threaded stud device may have (a) a shaft engaged with a first end of the spring, (b) a head piece, and (c) an internally-facing surface defining a passageway that extends through the head piece and the shaft. The second stud device may have (a) a shaft with a first end and a second end, and (b) an end piece. The first end of the second stud device may be engaged with a second end of the spring. The second stud device may include an internally-facing surface defining a hole that extends from the first end toward the second end of the second stud device. The end-piece, which may be a nut or an anchor, may be engaged with the second end of the second stud device. Part of the shear pin resides in the passageway of the first stud device, and a different part of the shear pin engages the second stud device. Also, the shear pin may include a slot on an end of the shear pin that may be used to remove a portion of the shear pin from the second stud device after the shear pin breaks.

The fastener assembly may include a first washer and/or a second washer. If utilized in the assembly, the first washer may reside around a portion of the shaft of the first stud device, and may be located between the head piece of the first stud device and the first end of the spring. When the end piece is a nut, the second washer may reside around a portion of the second stud device, and may be located between the nut and the second end of the spring. When the end-piece is an anchor attached to a wall or ceiling, it may not be necessary to include the second washer. It will be recognized that if the head piece is large enough, it may not be necessary to include the first washer in the assembly. The washers may be used to transfer force from the assembly to the objects (e.g. mailbox posts) that are being held relative to each other by the assembly.

The shaft of the first stud device may have externally-facing threads that engage an internally-facing surface on the first end of the spring. The second stud device may have externally-facing threads that engage an internally-facing surface on the second end of the spring. In this manner, a portion of the first stud device and a portion of the second stud device may each engage the spring, and different portions of the first stud device and second stud device may extend from the spring.

A portion of the shear pin may have an externally-threaded surface that engages the second stud device. The second stud device may have an internally-threaded surface that engages the shear pin. For example, the internally-threaded surface of the second stud device may engage the externally-threaded surface of the shear pin.

The assembly may include devices for preventing part of the shear pin from leaving the assembly when the shear pin breaks. One such device utilizes a retention clip. The shear pin may have a head and an internally-facing surface defining an orifice that extends through the head of the shear pin. A different end of the retention clip may extend around a portion of the head piece. The end of the retention clip that extends through the orifice in the shear pin head may be tied off or knotted so that the clip does not leave the orifice in the shear pin head.

A more complex device for preventing part of the shear pin from leaving the assembly includes a washer residing around a portion of the shaft of the first stud device and located between the head piece and the first end of the spring. The washer has at least two extensions, each of which receives a different end of a retention clip. The retention clip may be positioned to prevent the shear pin from leaving the first stud device. When it is desired to install a shear pin, the retention clip may be rotated aside, without removing the clip from the washer. Once the shear pin is installed, the clip may be rotated back to a position where the clip will prevent a broken portion of the shear pin from leaving the assembly.

The fastener assembly may be used to join two beams of a mailbox post. The first and second beams of the mailbox post may be made of wood. The fastener assembly may be used to keep the beams close to each other so as to facilitate making a mailbox available to postal-service employees. When a force of sufficient magnitude (a "threshold force") is applied to one of the beams, the shear pin will break, thereby allowing one of the beams to move relative to the other beam without significant damage to either of the beams. After the shear pin breaks, the spring holds the beams to each other in a relatively flexible manner so as to continue providing the mailbox to postal-service employees. To facilitate this functionality, the shear pin may be made from a material that will break prior to damage occurring to the beams.

The fastener assembly may be used to provide support to a support member, such as a pipe hanger. When a force exceeding the threshold is applied to the support member, the shear pin will break, and the spring may then be used to provide support to the support member, albeit in a relatively flexible manner. The shear pin may be made from a material that will break prior to damage occurring to the support member, the anchor, or the object (e.g. a wall or ceiling) in which the anchor is fixed. Since such hangers are often not easily reached, it may be prudent to provide a mechanism by which a maintenance person can determine the state of the shear pin from a distance. Such a mechanism may be a colored surface of the shear pin that is not exposed to view until the shear pin breaks. When the shear pin breaks and comes to rest by way of the retention clip, the colored surface of the shear pin drops away from the spring so that the colored surface becomes visible to maintenance personnel. Upon seeing the colored surface, the maintenance personnel will be alerted to the need to install a new shear pin.

BRIEF DESCRIPTION OF THE DRAWINGS

For a fuller understanding of the nature and objects of the invention, reference should be made to the accompanying drawings and the subsequent description. Briefly, the drawings are:

FIG. 5 is a side view of a bolt;

FIG. 6 is a side view of a spring;

FIG. 7 is a cross-sectioned side view of a threaded stud;

FIG. 8 is an end-view of a nut;

FIG. 9 is a side view of a shear pin;

FIG. 10 is an end view of a washer (one of two);

FIG. 11 depicts a retention clip;

FIG. 15 is a side-view of the mailbox post depicted in FIG. 14A, but the horizontal beam 210 has been moved as a result of the application of a vertical force;

FIG. 16 is a side-view of a retention system;

FIG. 17 is a layout view of an assembly according to the invention;

FIG. 18 is a layout view of the assembly of FIG. 17, but the washer 50 has been replaced by the retention system of FIG. 16;

FIG. 19 is a section view of the assembly shown in FIG. 18 that has been partially cross-sectioned; and FIG. 20 is a section view of a variation of the assembly depicted in FIG. 19 in which the shear pin is a threaded stud and nut rather than a bolt.

FURTHER DESCRIPTION OF THE INVENTION

Figure 1:
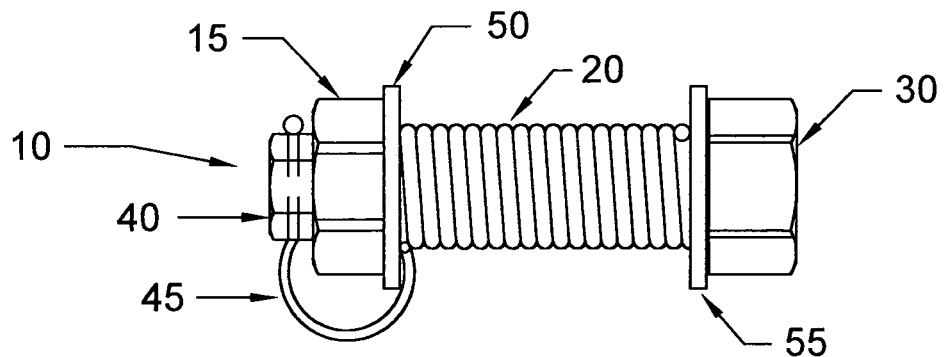
FIG. 1 is a layout view of an assembly according to the invention.
Figure 2A:
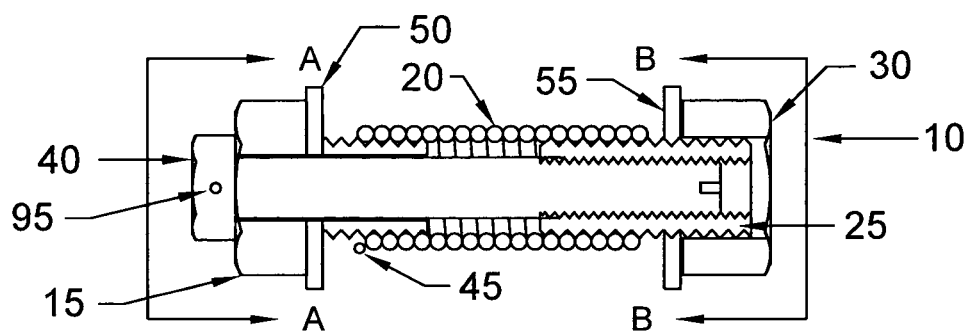
FIG. 2A is a partially cross-sectioned side-view of the assembly depicted in FIG. 1.
Figure 2B:
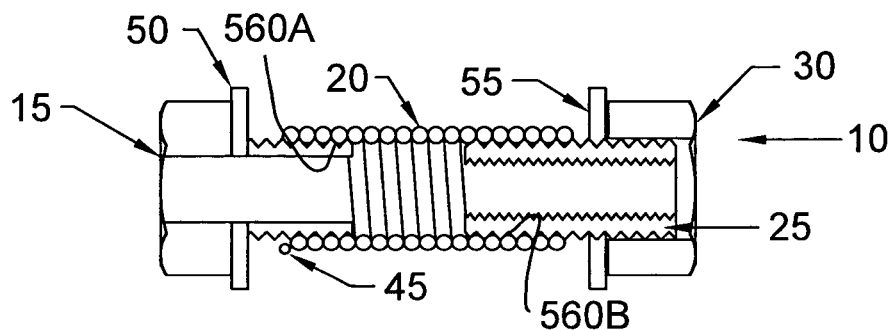
FIG. 2B is a partially cross-sectioned side view of the assembly depicted in FIG. 1, but without the shear pin.
Figure 3:
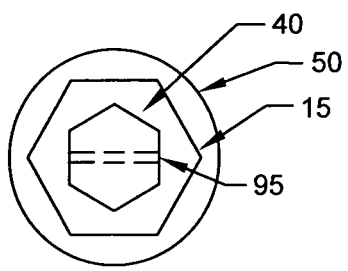
FIG. 3 is an end-detail view of the assembly depicted in FIG. 1 showing the bolt and shear pin head.
Figure 4:
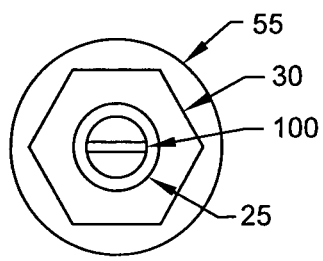
FIG. 4 is an end-detail view of the assembly depicted in FIG. 1 showing the nut and shear pin slot.

FIGS. 1, 2A, 2B, 3 and 4 depict a connector system 10 according to one embodiment of the invention. That embodiment of the connector system 10 has a threaded bolt 15 (FIG. 5), a spring 20 (FIG. 6), a threaded stud 25 (FIG. 7), a threaded end-piece, which may be a nut 30 (FIG. 8) or anchor 500 (FIGS. 17-20) for mating with externally-facing threads 35 of the stud 25, and a rigid shear pin 40 (FIG. 9). With regard to the "Summary of the Invention" provided above, it will be noted that the "first stud device" is the bolt 15 and the "second stud device" is the threaded stud 25 along with the threaded end-piece.

One or more washers (FIG. 10) may be included. For example, a bolt-side washer 50 and a nut-side washer 55 may be included. The bolt 15 may have a shaft 60 with externally-facing threads 75, and a head section 65, and an internally-facing surface 77 that provides a longitudinal passageway 550 extending through the head section 65 and the shaft 60. The stud 25 may have externally-facing threads 75 and an internally-facing surface 78 that provides a longitudinal hole 555 extending at least part way through the stud 25. At least part of the internally facing surface 78 of the stud 25 may have internally-facing threads 85.

The bolt 15, spring 20 and stud 25 may be formed from a material that is strong relative to the shear pin 40. For example, the bolt 15, spring 20 and stud 25 may be steel, and the shear pin may be a nylon material. Alternatively, or in addition, a portion of the shear pin 40 may have a reduced diameter so as to serve as a stress concentrator, and thereby facilitate breaking at a particular location of the shear pin 40. In this manner, the shear pin 40 is more likely to break than are the bolt 15, spring 20 or stud 25 when a force is applied to the connector system 10. In one embodiment of the invention, Nylon 66 may be used for the shear pin 40, carbon-steel may be used for the bolt 15 and stud 25, and the spring 20 may be hard drawn, tempered spring steel with a zinc plating.

The threads of the bolt 15 and the threads of the stud 25 may be selected to mate with the coils of the spring 20. The spring 20 may be selected to withstand a desired load, and then the threads of the bolt 15 and stud 25 may be selected to mate with the spring 40. For example, the spring 20 may be made from wire having a diameter of 0.092 inches. That wire may be formed into a four-inch long spring having a 0.750 inch outside diameter so as to support a load of about 31 pounds and yet return to its pre-load shape once such a load is removed. A ⅝-11 bolt having 11 threads per inch (i.e. about 0.091" thread spacing) may be selected so that the externally-facing threads 75 of the bolt 15 mate with the coils of the spring 20 so that at least part of the spring wire resides the valley created by the crests of the threads. A similarly sized stud 25 may be selected so that the externally-facing threads 75 of the stud 25 mate with the coils of the spring 20. As such, the bolt 15 and the stud 25 may each be turned relative to the spring 20 so as to engage the spring 20 with the threads of the bolt 20 and the stud 25.

One manner of assembling the connector system 10 may involve the following procedure:
 a. the bolt-side washer 50 may be placed around the bolt shaft 60 and against the head section 65 of the bolt 15;
 b. a retention clip 45 (described below) may be placed so that a first end of the retention clip 45 extends around an edge of the head section 65 and engages a surface of the bolt-side washer 50;
 c. the bolt 15 may be twisted into a first end 70 of the spring 20 so that the externally-facing threads 75 of the bolt 15 engage with the internally-facing surface 560A of the spring 20, and so that the bolt-side washer 50 and clip 45 reside between (and preferably in contact with) the head section 65 and the first end 70 of the spring 20;

d. the stud 25 may be twisted into a second end 80 of the spring 20 so that the externally-facing threads 75 of the stud 25 engage with the internally-facing surface 560B of the spring 20, and so that a portion of the stud 25 extends from the second end 80 of the spring 20;

e. the stud 25, spring 20, and part of the bolt 15 may be inserted into a hole that extends through the two objects to be joined (e.g. horizontal and vertical beams of a mailbox post), and the washer 50 contacts a surface of a first one of the objects (e.g. the horizontal beam of the mailbox post) to be joined;

f. the nut-side washer 55 may be placed around a portion of the stud 25 that extends from the spring 20, and in contact with a second one of the objects (e.g. the vertical beam of the mailbox post) to be joined;

g. the nut 30 may be threaded onto the stud 25 so that the nut-side washer 55 resides between (but preferably not in contact with) the second end 80 of the spring 20 and the nut 30;

h. the nut 30 may be turned so as to pull the stud 25 through the nut 30 until the spring 20 is placed in tension and the washer 55 exerts a force on one of the objects;

i. the externally-threaded section 110 of the shear pin 40 may be inserted through the bolt 15 and turned so as to engage the externally-threaded section 110 of the shear pin 40 with the internally-threaded section 85 of the stud 25;

j. a second end 90 of the retention clip 45 may be inserted through the orifice 95 that extends across the head of the shear pin 40 and secured.

Other methods of assembly are possible.

Upon breaking, the portion of the shear pin 40 that resides in the passageway 550 of the bolt 15 may have enough energy to eject that portion of the shear pin 40 from the bolt 15. In order to prevent that portion of the shear pin 40 from being ejected, the retention clip (FIG. 11) 45 may be included. Such a retention clip 45 may serve to retain the shear pin 40 within or near the bolt 15 when the shear pin 40 breaks. Alternatively, rather than preventing that portion of the shear pin 40 from leaving the bolt 15, the clip 45 may serve to reduce the velocity of that portion of the shear pin 40 upon breaking of the shear pin 40. As such, the clip 45 may prevent or impede ejection of the shear pin 40. The shear pin 40 may provide an orifice 95 through which the clip 45 may be inserted and secured. To secure the retention clip 45, an end 90 of the retention clip 45 may be knotted, bent, or wrapped in order to maintain the position of the retention clip 45 relative to the orifice 95.

Ideally, once assembled, the bolt 15 and stud 25 are separated from each other, but each is engaged with a different end of the spring 20. Such an arrangement provides a flexible connection between the bolt 15 and stud 25. The distance between the washers 50 and 55 may be adjusted by turning the bolt 15 and/or the stud 25 relative to the spring 20. When installed, the washers 50, 55 reside near a respective one of the objects so that the position of the objects may be fixed relative to each other. By installing the shear pin 40, the connection between the bolt 15 and stud 25 becomes more rigid so that the relative positions of the objects may be securely held, at least until the shear pin 40 breaks as a result of applying a threshold force to the connector system 10. Once a threshold force (i.e. a force of sufficient magnitude to break the shear pin 40) is applied, the shear pin 40 will break, and the spring 20 then provides a relatively flexible connection between the bolt 15 and stud 25. For example, the horizontal beam of a mailbox post may be held tightly against the vertical beam of the mailbox post until the threshold force is applied, and the shear pin 40 breaks. Once the shear pin 40 is broken, the horizontal beam is allowed to move away from the vertical beam by the applied force.

Once broken, the shear pin 40 can be replaced easily by removing: (a) the second end 90 of the retention clip 45 from the orifice 95 to remove a first portion of the shear pin 40 from bolt 15, and (b) a second portion of the shear pin 40 from the threaded stud 25 by use of a screwdriver in slot 100 of the shear pin 40. Once removed, a new shear pin 40 can be installed and the retention clip 45 can be inserted into the orifice 95 of the new shear pin 40.

The connector system 10 can be used where a flexible connection between two objects is desired in order to prevent damage to the objects when a force of sufficient magnitude is applied to one or both of the objects, but also provide a relatively rigid connection between those two objects under standard circumstances (i.e. when no force or a force less than a threshold magnitude). For example, two objects may be held near each other via the connector system 10. To do so, the bolt-side washer 50 contacts or applies a force to a first one of the objects, and the nut-side washer 55 contacts or applies a force to a second one of the objects so as to place the spring 20 under tension. In effect, the washers 50 and 55 apply forces in opposite directions, each to one of the two objects to be joined, with the spring pulling the objects together. To increase the forces applied to the objects, the nut 30 may be tightened, the bolt 15 may be tightened, or both. As the nut 30 and/or bolt 15 are tightened, the spring 20 extends (thereby increasing the tension) and the spring-diameter attempts to shrink, thereby holding the bolt 15 and threaded stud 25 more tightly. The shear pin 40 may be inserted through the passageway 550 of the bolt 15 and spring 20, and an end of the shear pin 40 may be inserted into the stud 25 until the shear pin threads 110 engage the internally-facing threads 85 of the internally threaded stud 25. The shear pin 40 may be tightened until the washers 50, 55 exert a desired force on the objects.

Figure 13:
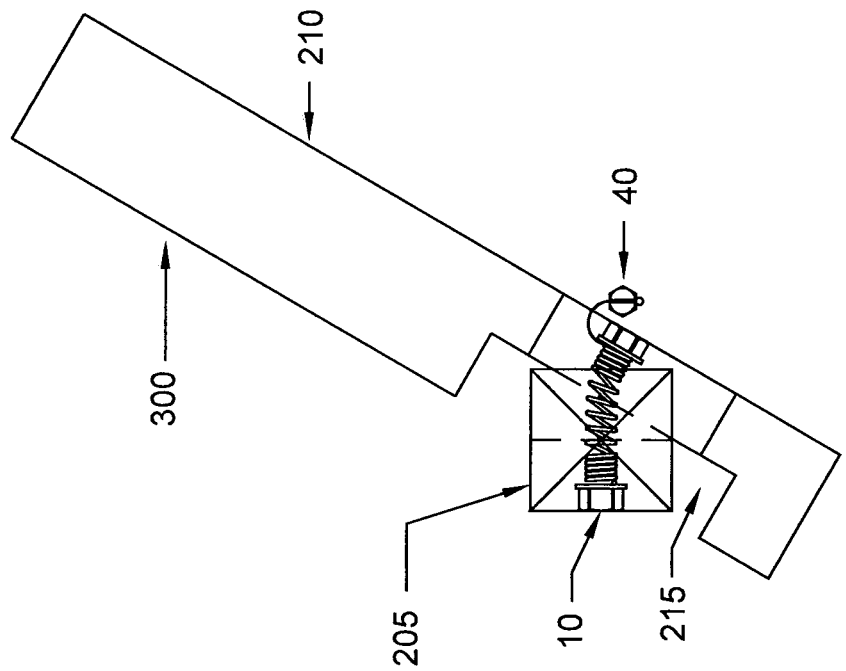
FIG. 13 is a top-view of the mailbox post depicted in FIG. 12, but the horizontal beam 210 has been moved as a result of the application of a horizontal force.
Figure 12:
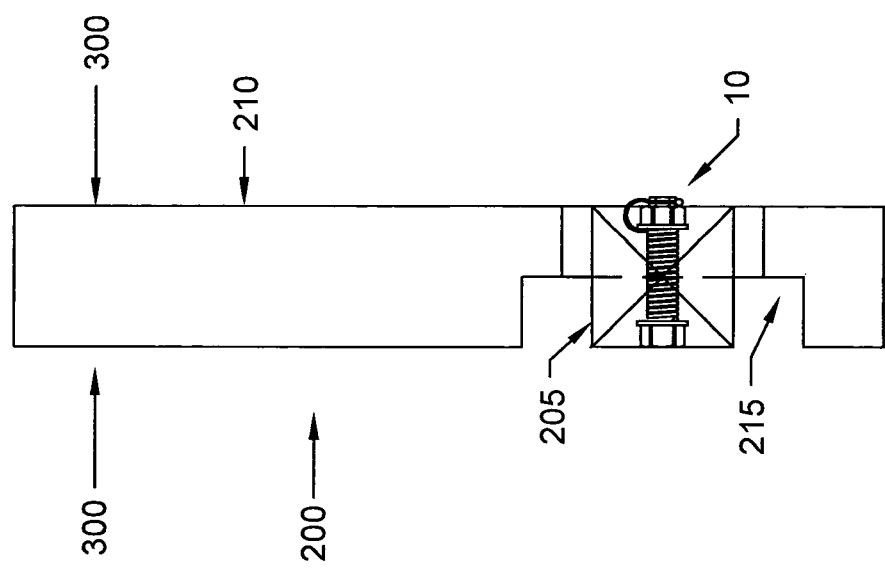
FIG. 12 is a top-view showing the assembly installed on a mailbox post without the application of a force.

In one embodiment of the invention, the connector system 10 may be used to join two parts of a wooden mailbox post 200, which is comprised of a vertical beam 205 and a horizontal beam 210. See FIG. 12. In prior art mailbox posts, the vertical beam 205 and horizontal beam 210 are often nailed together at a tight overlapping dado joint. The nailed joint of the prior art mailbox post is inflexible, which can lead to damage of the beams and the nails when a force is applied to the horizontal beam 210 of the mailbox post 200. For example, if a snow plow applies a horizontal force 300 to the horizontal beam 210, permanent damage often results to the prior-art mailbox post, and in particular in the area of the nailed joint. Horizontal forces 300 may also be applied from a vehicle backing into the mailbox post, or a child riding his/her bike into the mailbox post, and these too can cause damage. By replacing the prior-art nails with the connector system 10, such damage can be minimized or prevented. To do so, the connector system 10 may be installed through the horizontal and vertical beams 205 and 210 at a modified dado joint 215 in which the horizontal beam 210 is able to rotate (in two different horizontal directions) relative to the vertical beam 205, for example by up to 90 degrees, when a horizontal force 300 is applied. See FIG. 13. This ability to rotate the horizontal beam 210 relative to the vertical beam 205 protects the mailbox post 200 from damage, should a horizontal force 300 be applied to the horizontal beam 210. Prior to breaking the shear pin 40, the beams 205, 210 may be held tightly and relatively rigidly to one another. However, if a force 300 of sufficient magnitude (i.e. a threshold force) is applied to the horizontal beam 210, the shear pin 40 will break, and the connector system 10 then becomes relatively flexible, thereby allowing the horizontal beam 210 to move in the direction of the horizontal force 300. When the horizontal force 300 is removed, the horizontal beam 210 automatically moves back toward its original position by virtue of the spring 20 being under tension. In this manner, the mailbox post 200 remains functional, albeit in a relatively flexible state until rigidity is restored by replacing the shear pin 40.

Figure 14A:
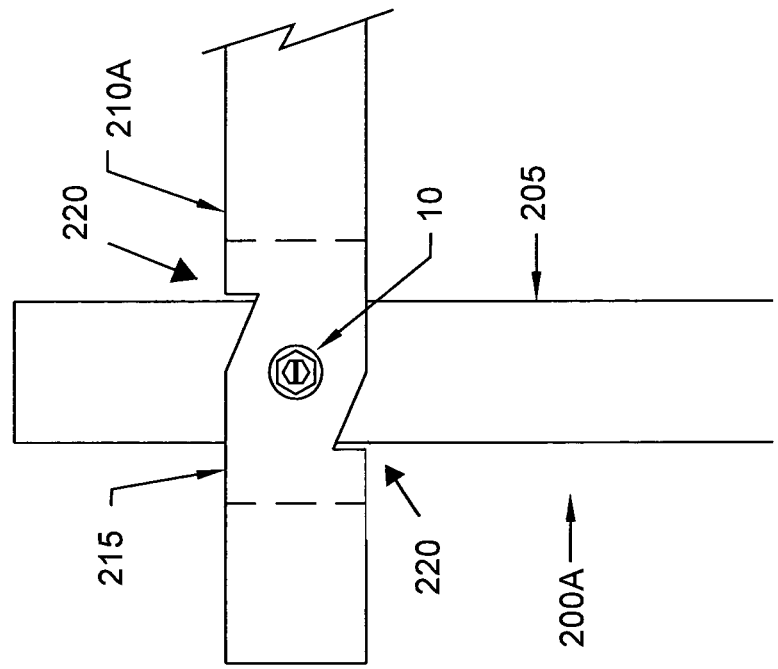
FIG. 14A is a side-view showing the assembly installed on a mailbox post that has angled surfaces on the vertical beam to facilitate vertical movement of the horizontal beam.
Figure 14B:
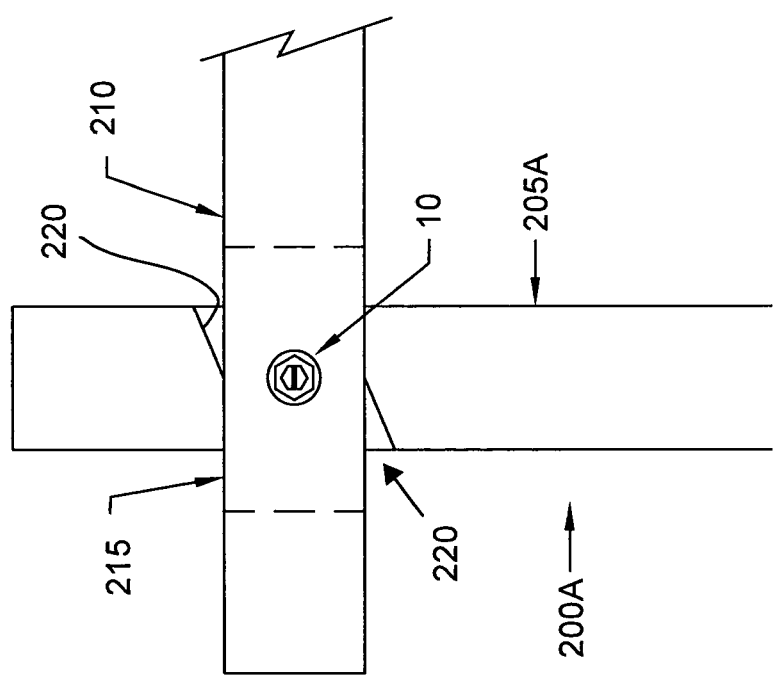
FIG. 14B is a side-view showing the assembly installed on a mailbox post that has angled surfaces on the horizontal beam to facilitate vertical movement of the horizontal beam.

With a modification to the mailbox post 200, the connector system 10 can also provide flexibility in response to a vertical force 400 applied to the horizontal beam 210. See FIGS. 14A, 14B and 15 show such a modified mailbox post 200A. There may be angled surfaces 220 on either the horizontal beam 210A which is similar to horizontal beam 210 but with angled surfaces 220, or vertical beam 205A which is similar to vertical beam 205 but with angled surfaces 220, of mailbox post 200A, such that the horizontal beam 210 is permitted to move in response to the vertical force 400. FIG. 14A shows the angled surfaces 220 on the vertical beam 205A. FIG. 14B shows the angled surface on the horizontal beam 210A. The application of a vertical force 400 may cause the horizontal beam 210A to rotate around the connector system 10. Although unlikely, it is possible that the shear pin 40 may be placed in torsion and thus break, but the connector system 10 will protect the mailbox post 200 from damage that would otherwise result from the application of a vertical force 400, and the mailbox post may remain functional thereafter, albeit in a relatively flexible state until the broken shear pin 40 is replaced.

It will now be recognized that in an embodiment of the invention, the dado joint may be manufactured so as to allow the horizontal beam 210 to move relative to the vertical beam 205 when the shear pin 40 has been broken as a result of a force applied to the horizontal beam 210. However, the portion of the dado joint on the vertical beam 205 may be a relatively tight fit with the horizontal beam 210 when vertical rotation of the horizontal beam 210 is not needed. The vertical beam 205 may have angled cuts 220 when it is desired to permit the horizontal beam 210 to rotate vertically relative to the vertical beam 205 if a force is applied from underneath or from above the horizontal beam 210. Regardless of the type of dado joint described above, the connector assembly 10 allows the horizontal beam 210 to rotate relative to the vertical beam when enough force is applied to break the shear pin 40.

FIGS. 16-20 illustrate another use of the connector assembly 10. In this embodiment, the connector assembly 10 may be affixed to a wall or ceiling 600. In this embodiment, the end-piece may be an internally-threaded anchor 500 (rather than the nut 30) that has been affixed to the wall or ceiling 600. The connector assembly 10 may be used to hold a support member 515, such as a pipe hanger or uni-strut, relative to the wall or ceiling 600. In this embodiment, the shear pin 40 may be installed through the support member 515 and threaded directly into the stud 25 which has been installed in the anchor 500 in the ceiling or wall 600. It should be noted that anchor 500 may be an anchor system. When the shear pin 40 breaks as a result of the application of a force of sufficient magnitude (i.e. a threshold force), the connector system 10 continues to provide some support to the support member 515, albeit in a relatively flexible state since the spring 20 then hold the support member 515, rather than the shear pin 40.

FIGS. 16, 18, 19 and 20 show a different type of retention system 510 being used to prevent a portion of a broken shear pin 40 from leaving the bolt 15. The retention system 510 may keep a portion of the broken shear pin 40 from falling after the shear pin 40 breaks. The retention system 510 depicted in FIGS. 16, 18, 19 and 20 includes a washer 520 that has two extension-sides 530, each having a hole 535 through which an end 540 of a retention clip 525 may be inserted. The ends 540 of the retention clip 535 may be bent so that the retention clip 525 is prevented from leaving the holes 535. The retention clip 525 may be swung to a side so that the shear pin 40 can be installed. Once the shear pin 40 is installed to the connector assembly 10, the retention clip 525 may be returned to a position that may prevent a portion of the shear pin 40 from falling away from the connector assembly 10 when the shear pin 40 breaks.

The shear pin 40 may have a section 505 (FIGS. 19 and 20) that is colored, such as by paint, so that a broken shear pin 40 can be identified easily. In FIGS. 19 and 20 the colored section is identified by the bracket pointed to by the lead-line 505. The colored section 505, which may be a bright color such as orange, may be located on the cylindrical portion of the shear pin 40 that is immediately proximate to the support member 515. In this manner, when the shear pin 40 breaks, the colored section 505 will move beyond the support member 515, thereby exposing the colored section of the shear pin 40 so as to be visible to maintenance personnel in order to indicate that a new shear pin will need to be installed. In the case of the arrangements depicted in FIGS. 18, 19 and 20, installation of a new shear pin 40 may require removal of the stud 25 from the anchor 500, or it may be necessary to extract the broken end of the shear pin 40 that remains in the stud 25.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A fastener assembly comprising:
a spring having a first end and a second end;
a first stud device having (a) a shaft engaged with the first end of the spring, (b) a head piece, and (c) an internally-facing surface defining a passageway extending through the head piece and the shaft;
a second stud device having (a) a shaft with a first end and a second end, and (b) an end-piece engaged with the second end of the second stud device, wherein the first end of the shaft of the second stud device is engaged with the second end of the spring;
a shear pin, part of which resides in the passageway of the first stud device, and a different part of which is engaged with the second stud device, wherein the shear pin has a head and an internally-facing surface defining an orifice that extends through the head of the shear pin; and
further comprising a first washer residing around a portion of the first stud device and located between the head piece of the first stud device and the first end of the spring.

2. The assembly of claim 1, further comprising a retention clip having a first end and a second end, wherein the first end of the clip extends around an edge of the first stud device and the second end of the clip extends through the orifice in the shear pin head.

3. A fastener assembly comprising:
a spring having a first end and a second end;

a first stud device having (a) a shaft engaged with the first end of the spring, (b) a head piece, and (c) an internally-facing surface defining a passageway extending through the head piece and the shaft;

a second stud device having (a) a shaft with a first end and a second end, and (b) an end-piece engaged with the second end of the second stud device, wherein the first end of the shaft of the second stud device is engaged with the second end of the spring;

a shear pin, part of which resides in the passageway of the first stud device, and a different part of which is engaged with the second stud device, wherein the shear pin has a head and an internally-facing surface defining an orifice that extends through the head of the shear pin; and wherein the end-piece is a nut, and the assembly further comprises a first washer residing around a portion of the second stud device and between the nut and the second end of the spring.

4. The assembly of claim 3, further comprising a retention clip having a first end and a second end, wherein the first end of the clip extends around an edge of the first stud device and the second end of the clip extends through the orifice in the shear pin head.

5. A fastener assembly comprising:
a spring having a first end and a second end;
a first stud device having (a) a shaft engaged with the first end of the spring, (b) a head piece, and (c) an internally-facing surface defining a passageway extending through the head piece and the shaft;
a second stud device having (a) a shaft with a first end and a second end, and (b) an end-piece engaged with the second end of the second stud device, wherein the first end of the shaft of the second stud device is engaged with the second end of the spring;
a shear pin, part of which resides in the passageway of the first stud device, and a different part of which is engaged with the second stud device, wherein the shear pin has a head and an internally-facing surface defining an orifice that extends through the head of the shear pin; and wherein an end of the shear pin has a slot.

6. The assembly of claim 5, further comprising a retention clip having a first end and a second end, wherein the first end of the clip extends around an edge of the first stud device and the second end of the clip extends through the orifice in the shear pin head.

7. A fastener assembly comprising:
a spring having a first end and a second end;
a first stud device having (a) a shaft engaged with the first end of the spring, (b) a head piece, and (c) an internally-facing surface defining a passageway extending through the head piece and the shaft;
a second stud device having (a) a shaft with a first end and a second end, and (b) an end-piece engaged with the second end of the second stud device, wherein the first end of the shaft of the second stud device is engaged with the second end of the spring;
a shear pin, part of which resides in the passageway of the first stud device, and a different part of which is engaged with the second stud device; and
wherein the shear pin has a head and an internally-facing surface defining an orifice that extends through the head of the shear pin.

8. The assembly of claim 7, further comprising a washer residing around a portion of the first stud device and located between the head piece of the first stud device and the first end of the spring.

9. The assembly of claim 7, wherein the end-piece is a nut, and the assembly further comprises a washer residing around a portion of the second stud device and between the nut and the second end of the spring.

10. The assembly of claim 7, wherein the end-piece is an anchor attached to a wall or ceiling.

11. The assembly of claim 7, wherein the first stud device shaft has externally-facing threads that engage an internally-facing surface of the spring.

12. The assembly of claim 7, wherein the second stud device has externally-facing threads that engage an internally-facing surface of the spring.

13. The assembly of claim 7, wherein an end of the shear pin has a slot.

14. The assembly of claim 7, wherein the second stud device further comprises an internally-facing surface defining a hole extending from the first end toward the second end of the second stud device.

15. The assembly of claim 7, wherein a portion of the shear pin has an externally-threaded surface that engages the second stud device.

16. The assembly of claim 7, wherein the second stud device has an internally-threaded surface that engages the shear pin.

17. The assembly of claim 16, wherein the shear pin has an externally-threaded surface that engages the internally-threaded surface of the second stud device.

18. The assembly of claim 7, further comprising a retention clip having a first end and a second end, wherein the first end of the clip extends around an edge of the first stud device and the second end of the clip extends through the orifice in the shear pin head.

19. The assembly of claim 7, further comprising:
a retention clip having a first end and a second end; and,
a washer residing around a portion of the first stud device and located between the head piece and the first end of the spring, the washer having extensions, each extension receiving a different end of the clip.

20. The assembly of claim 19, wherein the retaining clip is positioned to prevent the shear pin from leaving the first stud device.

21. A fastener assembly comprising:
a spring having a first end and a second end;
a first stud device having (a) a shaft engaged with the first end of the spring, (b) a head piece, and (c) an internally-facing surface defining a passageway extending through the head piece and the shaft;
a second stud device having (a) a shaft with a first end and a second end, and (b) an end-piece engaged with the second end of the second stud device, wherein the first end of the shaft of the second stud device is engaged with the second end of the spring;
a shear pin, part of which resides in the passageway of the first stud device, and a different part of which is engaged with the second stud device, wherein the shear pin has a head and an internally-facing surface defining an orifice that extends through the head of the shear pin; and
further comprising:
a retention clip having a first end and a second end; and,
a washer residing around a portion of the first stud device and located between the head piece and the first end of the spring, the washer having extensions, each extension receiving a different end of the clip.

22. The assembly of claim 21, further comprising a retention clip having a first end and a second end, wherein the first end of the clip extends around an edge of the first stud device and the second end of the clip extends through the orifice in the shear pin head.

\* \* \* \* \*